(12) United States Patent
Min et al.

(10) Patent No.: US 7,719,162 B2
(45) Date of Patent: May 18, 2010

(54) ELECTROSTATIC ACTUATOR AND CONTROLLER WITH PWM DRIVING

(75) Inventors: Dong-ki Min, Seoul (KR); Jin-ho Lee, Suwon-si (KR); Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 653 days.

(21) Appl. No.: 11/397,717

(22) Filed: Apr. 5, 2006

(65) Prior Publication Data

US 2006/0226733 A1   Oct. 12, 2006

(30) Foreign Application Priority Data

Apr. 7, 2005   (KR)   .................. 10-2005-0029079

(51) Int. Cl.
*H02N 1/00* (2006.01)
*G02B 26/08* (2006.01)
(52) U.S. Cl. ........................... 310/309; 318/116
(58) Field of Classification Search ................ 310/309; 318/116; 385/18; 359/223–226, 290, 291, 359/223.1, 224.1, 224.2, 225.1, 226.1, 226.2
See application file for complete search history.

(56) References Cited

U.S. PATENT DOCUMENTS

| | | | | |
|---|---|---|---|---|
| 4,546,292 A | * | 10/1985 | Audren et al. | 318/116 |
| 5,417,312 A | * | 5/1995 | Tsuchitani et al. | 188/181 A |
| 6,128,953 A | * | 10/2000 | Mizukoshi | 73/504.02 |
| 6,809,384 B1 | * | 10/2004 | Anderson et al. | 257/355 |
| 7,129,617 B2 | * | 10/2006 | Hong | 310/309 |
| 2002/0148291 A1 | * | 10/2002 | Nagahara et al. | 73/514.32 |
| 2006/0226733 A1 | * | 10/2006 | Min et al. | 310/309 |

FOREIGN PATENT DOCUMENTS

| | | |
|---|---|---|
| JP | 05-260766 A | 10/1993 |
| JP | 07-298647 A | 11/1995 |
| JP | 2000-329561 A | 11/2000 |
| JP | 2002-311045 A | 10/2002 |

* cited by examiner

*Primary Examiner*—Karl I Tamai
(74) *Attorney, Agent, or Firm*—Sughrue Mion, PLLC

(57) ABSTRACT

An electrostatic actuator and a method of driving the same are provided. The actuator controls the displacement of a target object by adjusting a voltage between fixed comb electrodes and a moving comb electrode. The actuator includes an actuator control signal generator generating an actuator control signal by pulse-width modulating an actuator driving signal and a carrier signal; and an actuator unit including the fixed comb electrodes and the moving comb electrode and adjusting the voltage according to the actuator control signal. Accordingly, the displacement can be easily controlled using the pulse-width-modulated actuator driving signal even when both the voltage of the actuator driving signal and the frequency of the carrier signal are high.

10 Claims, 5 Drawing Sheets

ELECTROSTATIC ACTUATOR AND CONTROLLER WITH PWM DRIVING

This application claims priority from Korean Patent Application No. 10-2005-0029079, filed on Apr. 7, 2005, in the Korean Intellectual Property Office, the disclosure of which is incorporated herein by reference in its entirety.

BACKGROUND OF THE INVENTION

1. Field of the Invention

Apparatuses and methods consistent with the present invention relate to an actuator and a method of driving the same, and more particularly, to an actuator which can detect the displacement of a target object using a modulated actuator driving signal without an operational amplifier and a method of driving the actuator.

2. Description of the Related Art

Actuators control the displacement of a target object by adjusting voltage between fixed comb electrodes and a moving comb electrode. An actuator control signal applied to the fixed comb electrodes for displacement detection may be an actuator driving signal in which a high frequency carrier signal is contained.

Here, the actuator control signal is generated by an operational amplifier disposed on an electrostatic actuator. However, it is difficult for a high frequency carrier signal to be contained in a high voltage actuator driving signal due to features of the operational amplifier.

As a result, when the voltage of the actuator driving signal and the frequency of the carrier signal are high, it is difficult for conventional actuators to detect the displacement using a modulated actuator driving signal.

SUMMARY OF THE INVENTION

The present invention provides an actuator which can control and detect displacement of a target object using a pulse-width modulated actuator driving signal without an operational amplifier.

The present invention also provides a method of driving an actuator which can control and detect displacement of a target object using a pulse-width-modulated actuator driving signal without an operational amplifier.

The present invention also provides a computer readable recording medium having embodied thereon a computer program for driving an actuator which can control and detect the displacement of a target object using a pulse-width-modulated actuator driving signal without an operational amplifier.

According to an aspect of the present invention, there is provided an electrostatic actuator for controlling displacement of a target object by adjusting a voltage between fixed comb electrodes and a moving comb electrode, the electrostatic actuator comprising: an actuator control signal generator generating an actuator control signal by pulse-width modulating an actuator driving signal and a carrier signal; and an actuator unit comprising the fixed comb electrodes and the moving comb electrode and adjusting the voltage according to the actuator control signal.

The electrostatic actuator may further comprise a sensor sensing a change of charges accumulated between the fixed comb electrodes and the moving comb electrode; and an actuator driving signal controller comparing the sensed change of the charges with a preset reference value and generating an actuator driving signal based on the comparison result.

The sensor may comprise a detector sensing the change of the charges and generating a detection signal indicating the sensed result; and a sampling and holding unit sampling the detection signal at predetermined time intervals and holding the sampled values.

The electrostatic actuator may further comprise a sampling controller generating information about a critical time when the magnitude of the carrier signal reaches a preset critical level, wherein the sampling and holding unit samples the detecting signal at critical times.

The electrostatic actuator may further comprise a limiter setting a magnitude of the actuator driving signal above a preset upper limit to an upper limit.

According to another aspect of the present invention, there is provided a method of driving an actuator which controls displacement of a target object by adjusting a voltage between fixed comb electrodes and a moving comb electrode, the method comprising: generating an actuator control signal by pulse-width modulating an actuator driving signal and a carrier signal; and adjusting the voltage according to the actuator control signal using an actuator unit that includes the fixed comb electrodes and the moving comb electrode.

The method may further comprise sensing the change of charges accumulated between the fixed comb electrodes and the moving comb electrode; and comparing the sensed change of the charges with a preset reference value and generating an actuator driving signal according to the comparison result.

According to still another aspect of the present invention, there is provided a computer readable recording medium having embodied thereon a computer program for a method of driving an actuator which controls the displacement of a target object by adjusting a voltage between fixed comb electrodes and a moving comb electrode, the method comprising: generating an actuator control signal by pulse-width modulating an actuator driving signal and a carrier signal; and adjusting the voltage according to the actuator control signal using an actuator unit that includes the fixed comb electrodes and the moving comb electrode.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described in more detail with reference to the accompanying drawings, in which exemplary embodiments of the invention are shown. Terms used herein are defined considering their functions in the present invention, however they are subject to change according to different users, the intentions of the users, or users' practices.

Figure 1:
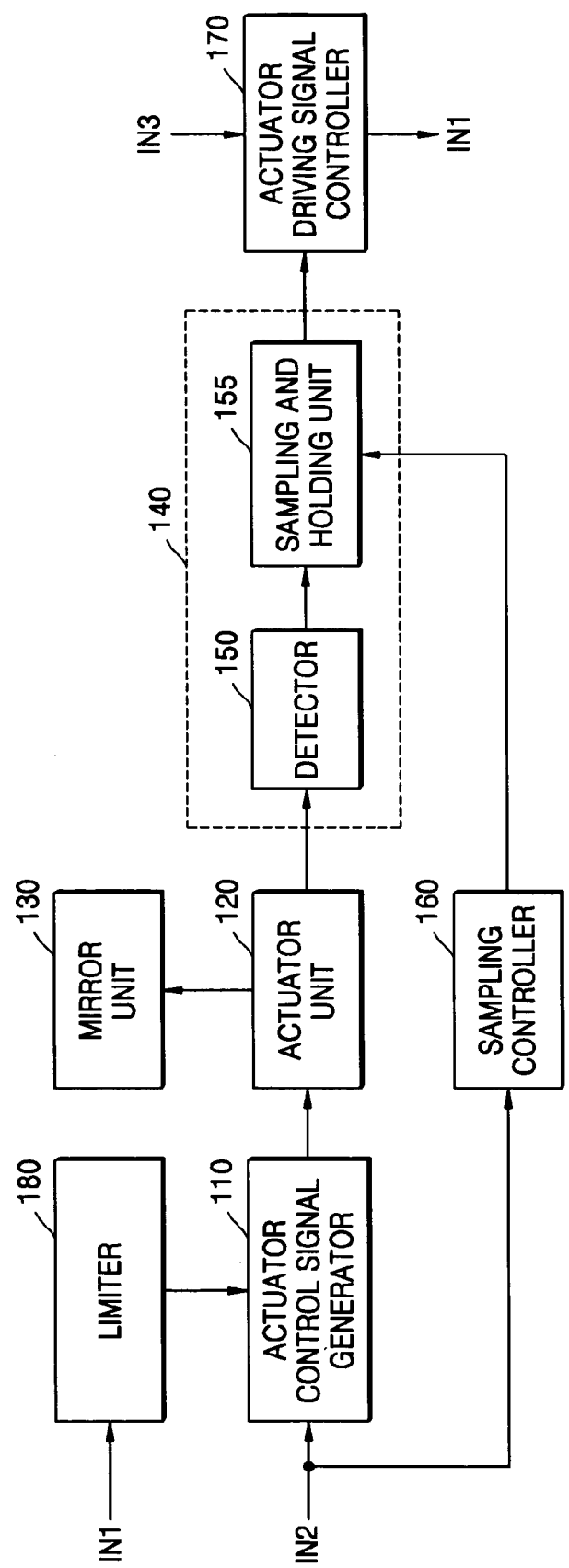
FIG. 1 is a block diagram of an actuator according to an exemplary embodiment of the present invention.

FIG. 1 is a block diagram of an actuator according to an exemplary embodiment of the present invention. The actuator includes an actuator control signal generator 110, an actuator unit 120, a mirror unit 130, a sensor 140, a sampling controller 160, an actuator driving signal controller 170, and a limiter 180.

The actuator control signal generator 110 generates an actuator control signal by pulse-width modulating an actuator driving signal IN1 and a carrier signal IN2. For example, the actuator control signal has a pulse for a duration when the carrier signal IN2 is greater than the actuator driving signal IN1.

Figure 2:
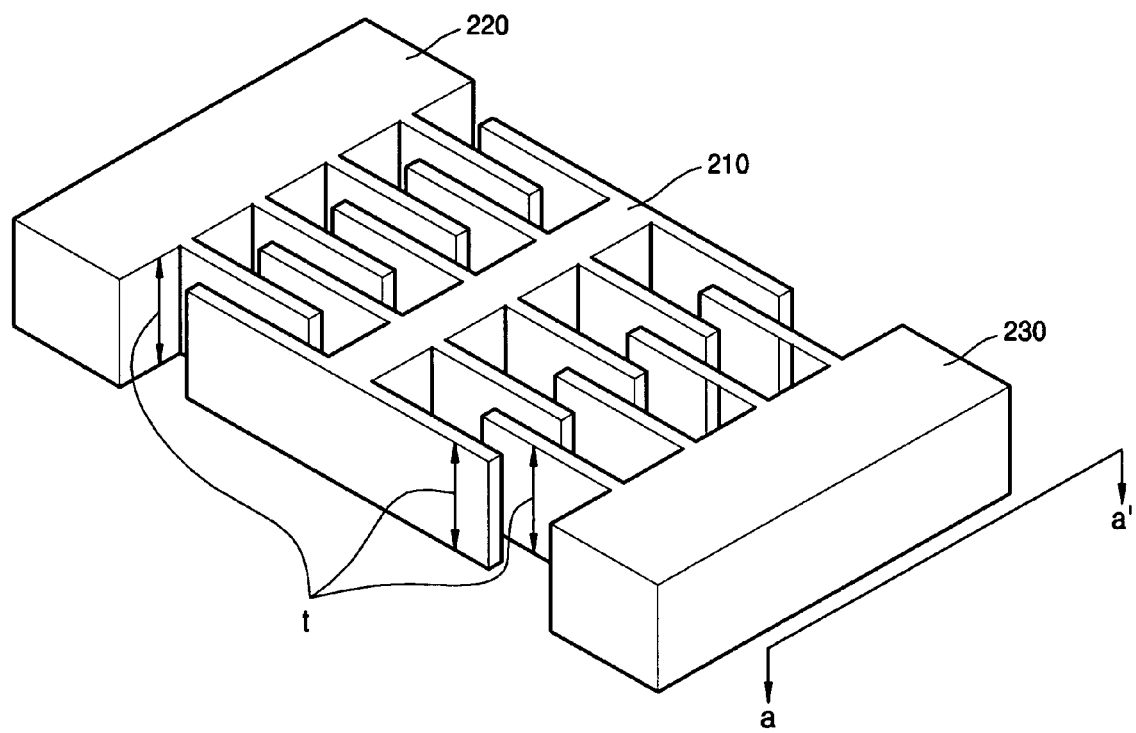
FIG. 2 is a perspective view of an actuator unit of the actuator of FIG. 1.

As shown in FIG. 2, the actuator unit 120 includes fixed comb electrodes 220 and 230 and a moving comb electrode 210. Here, the actuator unit 120 may be an electrostatic actuator unit. The electrostatic actuator unit 120 controls displacement of a target object by adjusting voltage between the fixed comb electrodes 220 and 230 and the moving comb electrode 210. Here, the voltage is controlled according to the actuator control signal, and is applied to the fixed comb electrodes 220 and/or 230.

That is, a switching element (not shown) may be interposed between the actuator control signal generator 110 and the actuator unit 120. When the switching element is turned on by the actuator control signal, the voltage is applied between the fixed comb electrodes 220 and 230 and the moving comb electrode 210.

A position of the moving comb electrode 210 relative to the fixed comb electrodes 220 and 230 changes due to the applied voltage, and information (hereinafter referred to as "change information") about the position change is output from the moving comb electrode 210 as information about the change of charges or current through the actuator 120.

If the electrostatic actuator 120 is installed in a projection television (TV) and controls a mirror to determine the position of a beam projected onto a TV screen, the mirror becomes a target object. The actuator unit 120 controls the displacement by adjusting the position of the moving comb electrode 210 relative to the fixed comb electrodes 220 and 230 according to the actuator control signal.

The mirror unit 130 includes a mirror, and is connected to the moving comb electrode 210 of the actuator unit 120. As a result, the mirror is moved as the moving comb electrode 210 is moved, thereby resulting in a change in the position of the mirror. Alternatively, the mirror unit 130 may be the moving comb electrode 210.

Here, the position of the mirror may be changed by a rotation movement or translation movement. The mirror is used for illustrative purposes, but any element whose displacement can be controlled by the electrostatic actuator unit 120 may be substituted in place of the mirror.

The sensor 140 senses the change of the charges or current. That is, the sensor 140 senses the change information output from the moving comb electrode 210 of the actuator unit 120.

More specifically, a detector 150 of the sensor 140 senses the change of the charges or current, and generates a detection signal indicating the sensed result. Here, a magnitude of the detection signal is proportional to the displacement. A sampling and holding unit 155 of the sensor 140 samples the detection signal at predetermined time intervals and retains the sampled values. A signal output from the sensor 140 is referred to as a sensor signal hereinafter.

The sampling controller 160 generates information about a critical time when a magnitude of the carrier signal IN2 reaches a preset critical level. In this case, the sampling and holding unit 155 may sample the detection signal at critical times.

The actuator driving signal controller 170 compares the change of the charges or current sensed by the sensor 140 with a preset reference value IN3, and generates an actuator driving signal IN1 in response to the comparison result. That is, the actuator driving signal controller 170 compares a magnitude of the sensor signal with the preset reference value IN3, and generates the actuator driving signal IN1 in response to the comparison result.

The limiter 180 modifies a magnitude of the actuator driving signal IN1 above a preset upper limit to the preset upper limit. At all time intervals when an actuator driving signal IN1 greater than a carrier signal IN2 is input to the actuator control signal generator 110, the actuator control signal generator 110 generates an actuator control signal with a magnitude of 0. However, this problem can be prevented by using the limiter 180.

FIG. 2 is a perspective view of the actuator unit 120 of the actuator of FIG. 1. Referring to FIG. 2, the actuator unit 120 includes the fixed comb electrodes 220 and 230 and the moving comb electrode 210. The fixed comb electrodes include a first fixed comb electrode 220 and a second fixed comb electrode 230. The fixed comb electrodes 220 and 230 and the moving comb electrode 210 are comb-shaped. The actuator control signal is applied to the fixed comb electrodes 220 and 230, and the change information is output from the moving comb electrode 210.

Figure 3:
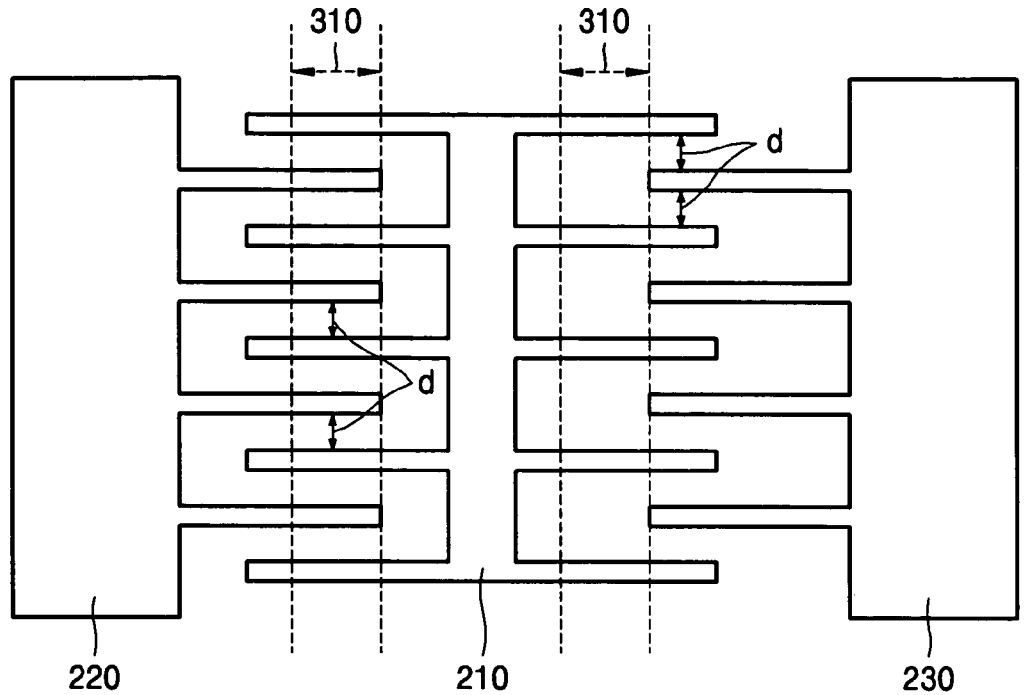
FIG. 3 is a cross-sectional view taken along line a-a' of FIG. 2.

FIG. 3 is a cross-sectional view taken along line a-a' of FIG. 2. Charges accumulate between protruded portions of the moving comb electrode 210 and protruded portion of the fixed comb electrodes 220 or 230. The moving comb electrode 210 and the fixed comb electrodes 220 and 230 may be plate electrodes.

If the moving comb electrode 210 is moved by a distance "x" toward the first fixed comb electrode 220, the moving comb electrode 210 is separated by a distance "x" from the second fixed comb electrode 230. In this case, the number of charges accumulated between the moving comb electrode 210 and the first fixed comb electrode 220 increases, and the number of charges accumulated between the moving comb electrode 210 and the second fixed comb electrode 230 decreases.

Figure 4:
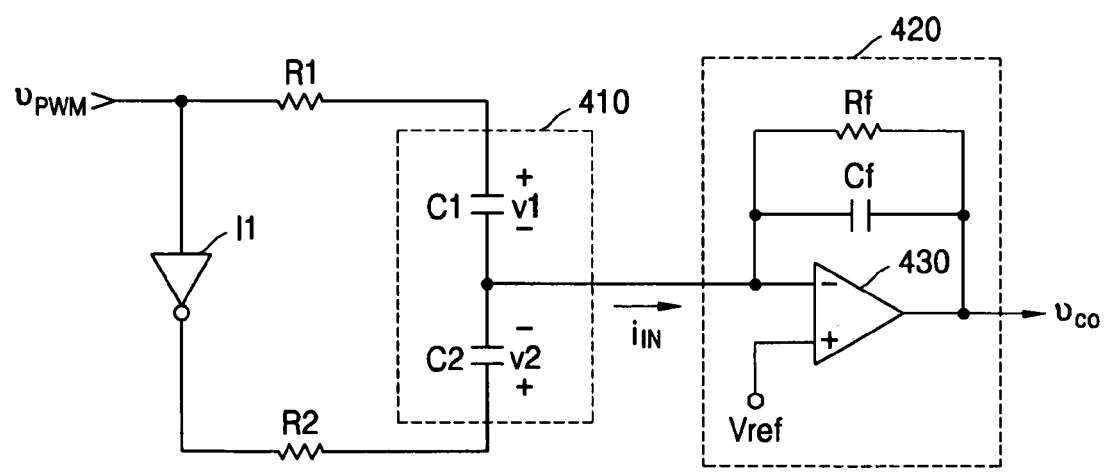
FIG. 4 is a circuit diagram of a detector of the actuator of FIG. 1.

FIG. 4 is a circuit diagram of the detector 150 of the actuator of FIG. 1. Since charges accumulate between the moving comb electrode 210 and the fixed comb electrodes 220 and 230, the actuator unit 120 may be embodied by a circuit 410.

That is, the protrusions of the moving comb electrode 210 and the first fixed comb electrode 220 may function as a capacitor c1. Similarly, the protrusions of the moving comb electrode 210 and the second fixed comb electrode 230 may function as a capacitor c2. A first resistor R1 and a second resistor R2 may be disposed between the actuator control signal generator 110 and the actuator unit 120.

An actuator control signal $v_{PWM}$ is pulse-width-modulated and applied to the fixed comb electrodes 220 and 230 as described above. Referring to FIG. 4, the actuator control signal $v_{PWM}$ is applied to the first fixed comb electrode 220. The actuator control signal $v_{PWM}$ is also inverted and then applied to the second fixed comb electrode 230. To this end, an inverter 11 is connected to a first terminal of the second resistor R2.

As described above, the switching element (not shown) may be disposed between the actuator control signal generator 110 and the actuator unit 120. If the switching element includes a first switching element and a second switching element, a first terminal of the first switching element may be connected to the actuator control signal generator 110 and a second terminal of the first switching element may be connected to the first fixed comb electrode 220. Similarly, a first terminal of the second switching element may be connected to the actuator control signal generator 110 and a second terminal of the second switching element may be connected to the second fixed comb electrode 230. Consequently, the first switching element and the second switching element are turned on alternately.

When the first switching element is turned on, a first voltage is applied to the first fixed comb electrode 220 and a voltage applied between the fixed comb electrodes 220 and 230 and the moving comb electrode 210 becomes the first voltage. Similarly, when the second switching element is turned on, a second voltage is applied to the second fixed comb electrode 230 and a voltage applied between the fixed comb electrodes 220 and 230 and the moving comb electrode 210 becomes the second voltage. Here, the first voltage and the second voltage may be the same. The displacement of the target object is controlled according to a voltage level of the first voltage or the second voltage.

As a result, the amount of charges accumulated between the fixed comb electrodes 220 and 230 and the moving comb electrode 210 changes. Here, since the change of the charges indicates the position change, information about the change of the charges is the change information. The change information is contained in a current $i_{IN}$ input to the detector 150. The current $i_{IN}$ may be calculated by the following equations:

$$c_1 = C_o + c(x) = C_o + N\epsilon_o tx/d \quad (1)$$

$$c_2 = C_o - c(x) = C_o - N\epsilon_o tx/d \quad (2)$$

$$V_1(s) = V_{s1}(s)/(1+sR_1c_1) \quad (3)$$

$$V_2(s) = V_{s2}(s)/(1+sR_2c_2) \quad (4)$$

$$q = c_1v_1 + c_2v_2 = C_o(v_1+v_2) + N\epsilon_o tx(v_1-v_2)/d \quad (5)$$

$$i_{IN} = dq/dt = 2N\epsilon_o txS_r/d \quad (6)$$

Here, $C_0$ is a constant signifying $c_1$ or $c_2$ when x is zero (0).

Further, N denotes a number of comb units. That is, N denotes a number of spaces between the moving comb electrode 210 and the fixed comb electrodes 220 or 230 where charges can be accumulated. $\epsilon_0$ denotes a dielectric constant, and "t" denotes a width of the protrusions of the fixed comb electrodes 220 or 230 or the moving comb electrode 210.

"d" may denote a distance between a protrusion of the moving comb electrode 210 and an adjacent protrusion of the first fixed comb electrode 220 or a distance between a protrusion of the moving comb electrode 210 and an adjacent protrusion of the second fixed comb electrode 230.

"s" is a Laplace parameter, and $v_1+v_2$ is a constant. $S_r$ denotes a slew rate and may be $dv_1/dt$ or $-dv_2/dt$.

The detector 150 may be realized as a circuit 420. A first terminal of a resistor $R_j$ is connected to an output terminal of an operational amplifier 430 and a second terminal of the resistor $R_j$ is connected to an inverted terminal of the operational amplifier 430. Further, a first terminal of the capacitor $C_j$ is connected to the output terminal of the operational amplifier 430 and a second terminal of the capacitor $C_j$ is connected to the inverted terminal of the operational amplifier 430.

A non-inverted terminal of the operational amplifier 430 may be connected to a ground reference voltage $V_{ref}$. An output signal of the operational amplifier 430 is a detection signal $V_{CO}$. The detection signal may be expressed in the following equation:

$$V_{CO}/R_j + C_j dV_{CO}/dt + i_{IN} = O \quad (7)$$

Figure 5:
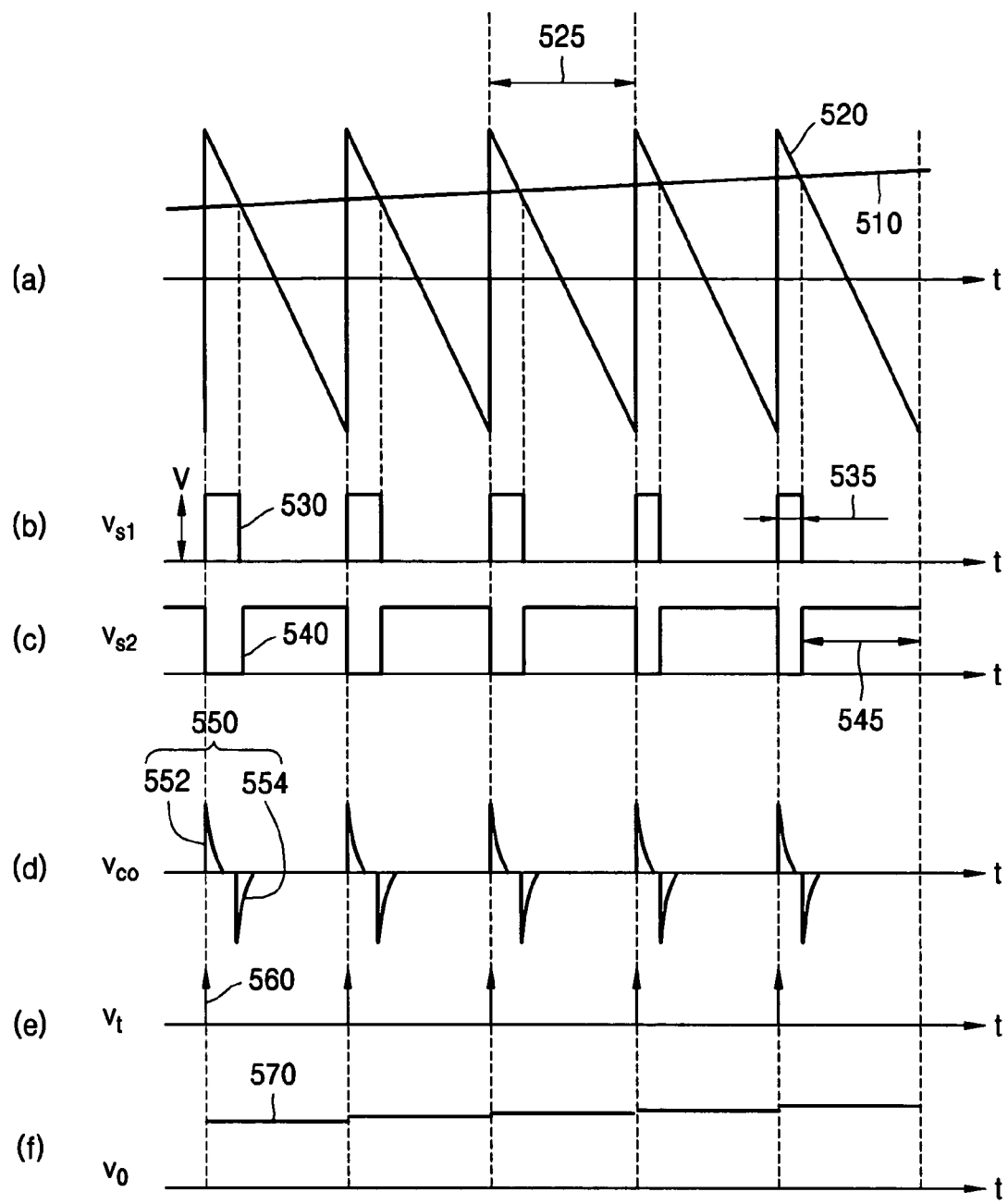
FIG. 5 illustrates timing diagrams of an actuator driving signal, a carrier signal, an actuator control signal, a detection signal, a trigger signal, and a sensor signal.

FIG. 5 illustrates timing diagrams of an actuator driving signal 510, a carrier signal 520, an actuator control signal 530, a detection signal 550, a trigger signal 560, and a sensor signal 570.

Referring to FIG. 5, the magnitude of the actuator driving signal 510 increases with time. In this case, the displacement of a target object increases. The carrier signal 520 may be a sawtooth-wave signal. Reference numeral 525 denotes a period T of the carrier signal 520.

$V_{s1}$ denotes an actuator control signal applied to the first fixed comb electrode 220, and $V_{s2}$ denotes an inverted signal of the actuator control signal, which is applied to the second fixed comb electrode 230. When a duty cycle D is a ratio used to describe how long $V_{s1}$ is turned on during the period T, reference numeral 535 denotes DT and reference numeral 545 denotes (1−D)T.

In the meantime, $V_{CO}(t)$ calculated by Equation 7 includes a first detection signal 552 and a second detection signal 554 as illustrated in FIG. 5(d). The first detection signal 552 is generated with respect to $V_{s1}$. Similarly, the second detection signal 554 is generated with respect to $V_{s2}$.

The trigger signal 560 may be triggered by the sampling controller 160 or a rising edge of the carrier signal 520. The sample and holder 155 samples and retains the detection signal 550 whenever the period T elapses. Since a time at which the second detection signal 554 is generated is variable according to the duty cycle D, the sample and holder 155 may sample the detection signal 550 whenever the first detection signal 552 is generated.

Since a time at which the carrier signal 520 rises up and a time at which the first detection signal 552 rises up are almost coincidental, the sample and holder 155 receiving the trigger signal 560 from the sampling controller 160 may sample the detection signal 550 every time the trigger signal 560 is generated. Consequently, the sensor signal 570 illustrated in FIG. 5(f) is generated.

Referring to FIG. 5, since the magnitude of the sensor signal 570 increases steadily, the electrostatic actuator unit 120 according to the present invention correctly responds to the applied actuator driving signal 510. The actuator driving signal controller 170 controls an actuator driving signal IN1 in response to the sensor signal 570.

Figure 6:
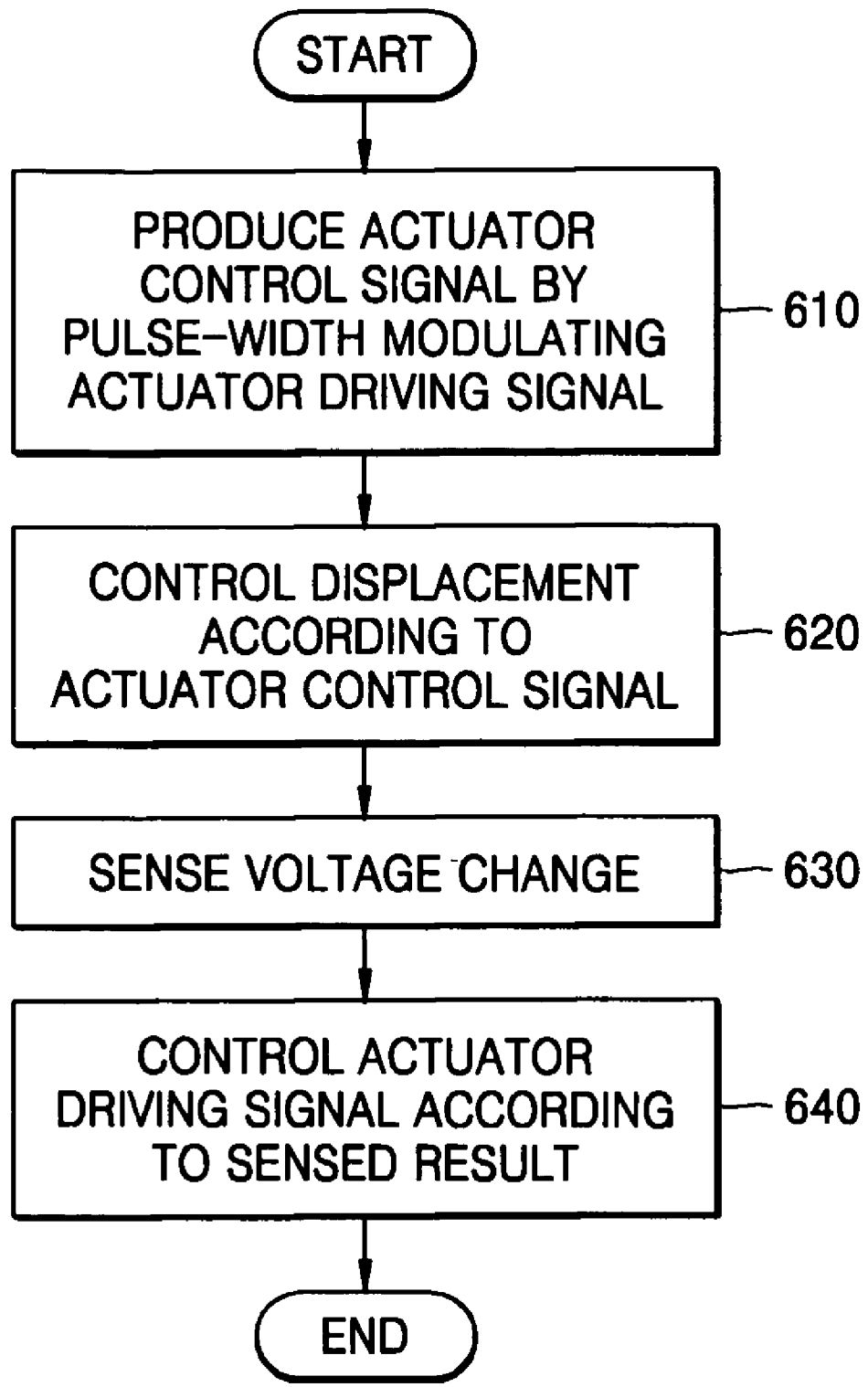
FIG. 6 is a flowchart of a method of driving an actuator according to an exemplary embodiment of the present invention.

FIG. 6 is a flowchart of a method of driving an actuator according to an exemplary embodiment of the present invention. The method includes operations 610 and 620 of generating an actuator control signal and controlling a displacement of a target object, and operations 630 and 640 of sensing a change of charges and controlling an actuator driving signal.

In operation 610, an actuator control signal generator pulse-width modulates a given actuator driving signal and generates an actuator control signal. In operation 620, an actuator unit controls the displacement of the target object according to the actuator control signal.

In operation 630, a sensor senses the change of charges accumulated between fixed comb electrodes and a moving comb electrode. In operation 640, an actuator driving signal controller controls an actuator driving signal according to the sensed result.

The present invention may be embodied as a computer readable code by running a program from a computer readable recording medium. The computer readable recording medium includes any medium that can store or transmit information. For example, the computer readable recording media include read-only memories (ROMs), random access memories (RAMs), compact disk-ROMs (CD-ROMs), magnetic tapes, floppy disks, optical disks, and carrier waves (e.g., transmissions over the Internet). The computer readable recording media can be installed dispersively in a computer system connected to a network, and stored and executed as computer readable code in a distributed computing environment through dispersion. Functional programs, codes, and code segments used for executing the present invention can be easily constructed by programmers skilled in the art.

As described above, an actuator and a method of driving the actuator according to the present invention can easily control displacement of a target object using a modulated actuator driving signal even though both the voltage of the actuator driving signal and the frequency of the carrier signal are high.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electrostatic actuator comprising:
   an actuator control signal generator which generates an inverted actuator control signal and an actuator control signal by pulse-width modulating an actuator driving signal and a carrier signal;
   an actuator unit which comprises fixed comb electrodes and a moving comb electrode, adjusts a first voltage between a first fixed electrode among the fixed comb electrodes and the moving comb electrode according to the actuator control signal, and adjusts a second voltage between the moving comb electrode and a second fixed comb electrode among the fixed electrode combs according to the inverted actuator control signal, to control displacement of a target object,
   a sensor which senses a change of charges accumulated between the fixed comb electrodes and the moving comb electrode by using a Low Pass Filter (LPF); and
   an actuator driving signal controller which compares the sensed change of the charges with a reference value and generates an actuator driving signal based on a result of the comparison.

2. The electrostatic actuator of claim 1, wherein the sensor comprises:
   a detector which senses the change of the charges and generates a detection signal indicating the sensed result; and
   a sampling and holding unit which samples the detection signal at predetermined time intervals and holds the sampled values.

3. The electrostatic actuator of claim 2, further comprising a sampling controller which generates information about times when a magnitude of the carrier signal reaches a preset level,
   wherein the sampling and holding unit samples the detecting signal at the times.

4. The electrostatic actuator of claim 1, further comprising a limiter which sets a magnitude of the actuator driving signal.

5. A method of driving an actuator which controls displacement of a target object, the method comprising:
   generating an inverted actuator control signal and an actuator control signal by pulse-width modulating an actuator driving signal and a carrier signal;
   adjusting a first voltage between a first fixed comb electrode among fixed comb electrodes and a moving comb electrode of an actuator unit according to the actuator control signal, and adjusting a second voltage between the moving comb electrode and a second fixed comb electrode among the fixed come electrodes according to the inverted actuator control signal, to control the displacement of the target object,
   sensing a change of charges accumulated between the fixed comb electrodes and the moving comb electrode by using a Low Pass Filter (LPF);
   comparing the sensed change of the charges with a reference value; and
   generating an actuator driving signal according to the comparison result.

6. The method of claim 5, wherein the sensing of the change of the charges comprises:
   sensing the change of the charges and generating a detection signal indicating a sensed result;
   sampling the detection signal at predetermined time intervals; and
   holding sampled values.

7. The method of claim 6, further comprising generating information about times when a magnitude of the carrier signal reaches a preset level,
   wherein the sampling of the detection signal comprises sampling the detection signal at the times.

8. A computer readable recording medium having a program recorded thereon, the program if executed by a computer causes the computer to execute the method of claim 5.

9. A method of driving an actuator which controls displacement of a target object, the method comprising:
   generating an inverted actuator control signal and an actuator control signal by pulse-width modulating an actuator driving signal and a carrier signal and
   adjusting a first voltage between a first fixed comb electrode among fixed comb electrodes and a moving comb electrode of an actuator unit according to the actuator control signal, and adjusting a second voltage between the moving comb electrode and a second fixed comb electrode among the fixed come electrodes according to the inverted actuator control signal, to control the displacement of the target object,
   wherein the generating the actuator control signal comprises pulse-width modulating the actuator driving signal and the carrier signal such that the actuator control signal has a pulse for a duration when the carrier signal is greater than the actuator driving signal.

10. An electrostatic actuator comprising:
    an actuator control signal generator which generates an inverted actuator control signal and an actuator control signal by pulse-width modulating an actuator driving signal and a carrier signal; and
    an actuator unit which comprises fixed comb electrodes and a moving comb electrode, adjusts a first voltage between a first fixed electrode among the fixed comb electrodes and the moving comb electrode according to the actuator control signal, and adjusts a second voltage between the moving comb electrode and a second fixed comb electrode among the fixed electrode combs according to the inverted actuator control signal, to control displacement of a target object,
    wherein the actuator control signal generates the actuator control signal by pulse-width modulating the actuator driving signal and the carrier signal such that the actuator control signal has a pulse for a duration when the carrier signal is greater than the actuator driving signal.

* * * * *